United States Patent
Hughes (10) Patent No.: US 10,938,002 B2
(45) Date of Patent: Mar. 2, 2021

(54) BATTERY CRUSH PROTECTION SYSTEM

(71) Applicant: A123 Systems LLC, Waltham, MA (US)

(72) Inventor: Timothy E. Hughes, Livonia, MI (US)

(73) Assignee: A123 Systems LLC, Waltham, MA (US)

( * ) Notice: Subject to any disclaimer, the term of this patent is extended or adjusted under 35 U.S.C. 154(b) by 236 days.

(21) Appl. No.: 15/148,964

(22) Filed: May 6, 2016

(65) Prior Publication Data

US 2016/0329538 A1 Nov. 10, 2016

Related U.S. Application Data

(60) Provisional application No. 62/157,880, filed on May 6, 2015.

(51) Int. Cl.
*H01M 2/10* (2006.01)
*H01M 10/0585* (2010.01)
(Continued)

(52) U.S. Cl.
CPC ....... *H01M 2/1072* (2013.01); *H01M 2/0242* (2013.01); *H01M 2/1083* (2013.01);
(Continued)

(58) Field of Classification Search
CPC . Y02E 60/122; H01M 2/1072; H01M 2/1094; H01M 2/0242; H01M 2/0585;
(Continued)

(56) References Cited

U.S. PATENT DOCUMENTS 2,603,671 A * 7/1952 Burns ................... H01M 2/043
220/363
4,587,183 A 5/1986 McCartney, Jr.
(Continued)

FOREIGN PATENT DOCUMENTS

CN 102569807 * 7/2012 ......... Y02E 60/122
JP 2007-048637 * 8/2005 ............. H01M 2/10
(Continued)

OTHER PUBLICATIONS

JP 2007-048637 English Machine Translation Espacenet Feb. 22, 2007.*
(Continued)

*Primary Examiner* — Cynthia H Kelly
*Assistant Examiner* — Aaron J Greso
(74) *Attorney, Agent, or Firm* — McCoy Russell LLP (57) ABSTRACT

The following description relates to systems and methods for a vehicle battery. The vehicle battery may be a Lithium-ion battery, and may comprise a plurality of prismatic shaped battery cells, arranged and stacked to form a series of battery cell groups, and where protective casings or partitioned chambers of a protective casing enclose each battery cell group. The protective casings, or component segments of a protective casing, may be coupled to one another by a series of ridges and mating grooves. A protective casing may alternatively comprise of a monolithic extrusion comprising a plurality of partitioned chambers. The protective casing may be configured to absorb a threshold compressive force without resulting in deformation of the battery cell groups.

19 Claims, 9 Drawing Sheets

(51) Int. Cl.
  *H01M 2/02* (2006.01)
  *H01M 10/052* (2010.01)

(52) U.S. Cl.
  CPC ....... *H01M 2/1094* (2013.01); *H01M 10/052* (2013.01); *H01M 10/0585* (2013.01); *H01M 2220/20* (2013.01); *Y02E 60/10* (2013.01)

(58) Field of Classification Search
  CPC ........... H01M 2230/20; H01M 10/052; H01M 10/0585; H01M 10/05
  See application file for complete search history.

(56) References Cited

U.S. PATENT DOCUMENTS

| | | | | |
|---|---|---|---|---|
| 2005/0255379 | A1* | 11/2005 | Marchio | H01M 2/0242 429/153 |
| 2005/0260488 | A1* | 11/2005 | Zhou | B60R 16/04 429/99 |
| 2010/0247997 | A1 | 9/2010 | Hostler et al. | |
| 2010/0250043 | A1* | 9/2010 | Scheucher | B60L 53/305 701/22 |
| 2010/0266878 | A1 | 10/2010 | Eilertsen | |
| 2010/0285346 | A1 | 11/2010 | Graban et al. | |
| 2013/0244089 | A1 | 9/2013 | Shimizu et al. | |

FOREIGN PATENT DOCUMENTS

| | | | | |
|---|---|---|---|---|
| JP | 2012-077839 | * | 4/2012 | ............... F16B 5/06 |
| WO | 2011141127 | A1 | 11/2011 | |

OTHER PUBLICATIONS

JP 2007-048637 JPO Abstract 2007 (C).*
JP 2012-077839 JPO Abstract Apr. 19, 2012.*
JP 2012-077839 Google Machine Translation printed Jan. 24, 2019.*
ISA Korean Intellectual Property Office, International Search Report and Written Opinion Issued in Application No. PCT/US2016/031343, dated Aug. 17, 2016, WIPO, 12 pages.
European Patent Office, Extended European Search Report Issued in Application No. 16790205.5, dated Nov. 14, 2018, Germany, 8 pages.

* cited by examiner

BATTERY CRUSH PROTECTION SYSTEM

CROSS REFERENCE TO RELATED APPLICATION

This application claims priority to U.S. Provisional Application No. 62/157,880, entitled "Battery Crush Protection System", filed May 6, 2015, which is hereby incorporated by reference in its entirety for all purposes.

TECHNICAL FIELD

The present application relates to multi-cell battery systems which comprise prismatic type battery cells.

BACKGROUND AND SUMMARY

Many vehicle batteries utilize prismatic battery cells assembled in series and parallel to meet the current and/or voltage requirements of the vehicle. However, the inventors herein have recognized potential issues with such vehicle batteries.

The forces generated during a vehicle impact or crash may be sufficiently large to damage and/or reduce the functionality of the vehicle battery. More specifically, with the increased use of Lithium-ion batteries, the inventors herein have recognized a need to increase the amount of compressive force such batteries can withstand.

This design also has created a new means of assembling and fixing cells and groups of cells within the battery, by using the very same elements that provide the crush protection to also constrain and retain the cells.

As one example, a battery comprises one or more battery modules, each battery module comprising one or more battery cell groups, and each battery cell group comprising only three cylindrical battery cells arranged in a triangular configuration. Further, the battery comprises an enclosure containing at least one battery module. The modular design approach improves assembly, enhances capability to mass produce, and improves ability to diagnose and to correct issues at a subassembly level. In another example, a battery may comprise a protective casing which may or may not comprise a modular design, which may also comprise one or more interior chambers divided by interior partitions. These interior partitions may increase an amount of compressive force that the protective casing may withstand.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Each of these figures is drawn approximately to scale and thus show relative sizing and positioning of components with respect to each other. In alternative embodiments, different relative sizing and/or positioning may be used, if desired.

DETAILED DESCRIPTION OF THE DEPICTED EMBODIMENTS

The following descriptions relate to the assembly and manufacture of a vehicle battery, which in some examples may be a Lithium-ion battery. A vehicle battery may contain a plurality of prismatic or cylindrical cells stacked to form an array, and configured in series and/or parallel to deliver a voltage and current sufficient to meet the demands of the battery. The battery cells may be arranged into groups, where the cells in each group may be electrically coupled in parallel with one another. Further, the groups of cells may be arranged and electrically coupled in series with one another. Each cell group may be encased with a protective casing, or may be encased in a chamber of a protective casing comprising a plurality of chambers. The protective casing may be metal, and may increase a compressive force that the battery can tolerate without being deformed.

Additionally, the protective casing may secure and retain the battery cells, so that movement of the cells within the battery may be reduced. Thus, this approach may also improve the integrity of the battery cell assembly. Specifically, the structure of the battery cell assembly may provide enhanced mechanical structure and durability.

Figure 1:
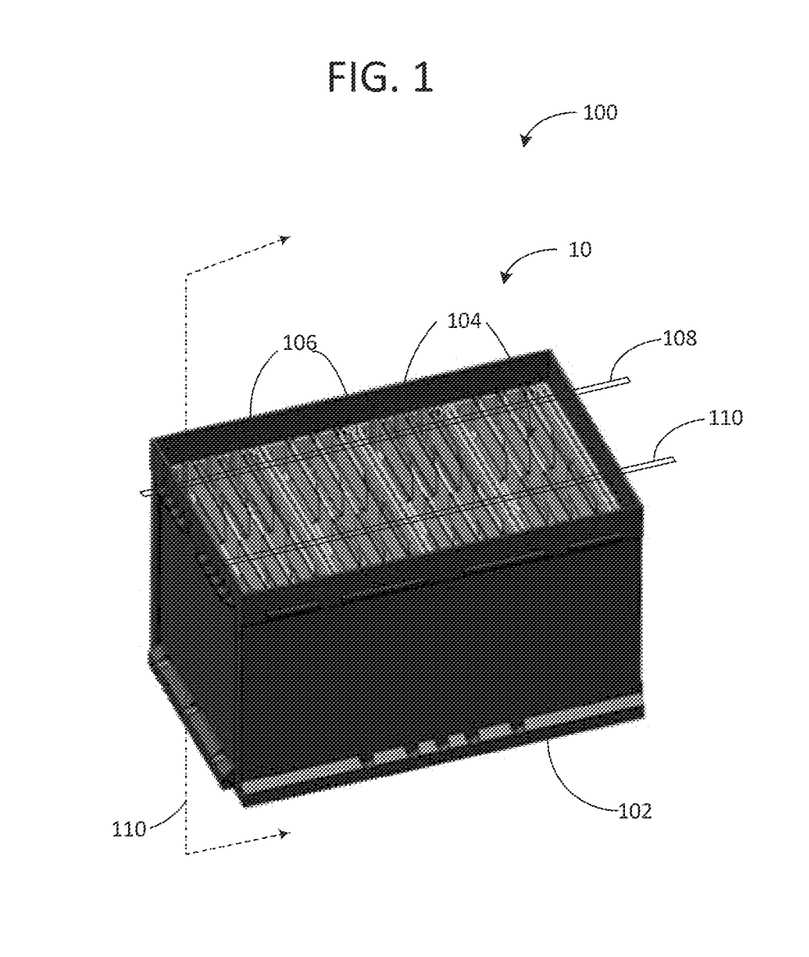
FIG. 1 shows a schematic of a battery.

FIG. 1 shows a schematic 100 of an exemplary embodiment of vehicle battery 10. This figure is drawn to scale, but other dimensions and relative scales may be used. The battery 10 may be a lithium-ion battery or any other rechargeable battery (e.g. Nickel-Cadmium (NiCd), Lead-Acid, Nickel-Metal-Hydride (NiMH), Nickel-Zinc (NiZn), etc.) suitable for storing electrical energy. The battery 10 has battery case 102. In one embodiment as shown in FIG. 1, the battery case 102 may be a hollow rectangular prism that houses internal components of the battery 10. In another embodiment the tray may be cylindrical. The battery case 102 may include ridges that may be arranged to form a grid that is raised from the surface of the battery case 102, to provide support, strength and increased rigidity to the battery case 102. Further, the battery case 102 may be made of plastic, and as such may provide a protective barrier for electrical and environmental isolation from interior components of the battery 10. The battery case 102 houses the interior components of the battery 10. Thus, directly within, and physically coupled to the interior surface of the battery case 102, is a protective casing 106. The protective casing 106 may be made of metal such as aluminum. However, in other examples, the protective casing 106 may be constructed from other metals such as steel, plastics such as nylon, composite plastics, or other structural composites. In some examples, the battery 10 may comprise only one protective casing 106. However, in other examples, the battery 10 may comprise more than one protective casing 106. Each protective casing 106 may house a battery cell group 104. In some examples, a battery cell group 104 may comprise only one battery cell. However, in other examples, a battery cell group 104 may comprise more than one battery cell. Thus, each protective casing 106 may comprise four walls that surround the battery cell group 104. Further, the protective casing 106, may provide a compressive force on the battery cell group 104, such that relative movement of the battery cell group 104 within the protective casing is restricted. In one embodiment, busbars 108 and 110 may be positioned in battery 10 such that they may be in electrical contact with some or all of the positive and/or negative terminals of cells 104, or to a configured selection of terminals. In one example, busbar 108 may serve as a positive terminal be electrically connected to a positive terminal of battery 10, and busbar 110 may serve as a negative terminal or be electrically connected to a negative terminal of battery 10. Busbar 108 may be positioned and/or configured such that it may be electrically connected with the positive terminals of the cells 104, or may be selectively connected to a selection of positive and/or negative terminals of certain cells 104, wherein the busbar 108 may be electrically equivalent to a positive terminal of battery 10 with cells 104 connected via busbars 108 and 110 either in series or in parallel. Similarly, busbar 110 may be positioned and/or configured such that it may be electrically connected with the negative terminals of the cells 104, or may be selectively connected to a selection of positive and/or negative terminals of certain cells 104, wherein the busbar 110 may be electrically equivalent to a negative terminal of a battery 10 with cells 10 connected via busbar 110 in series or in parallel. Cutting plane 110 defines a cross section of the battery 10 shown below in FIG. 2.

Figure 2:
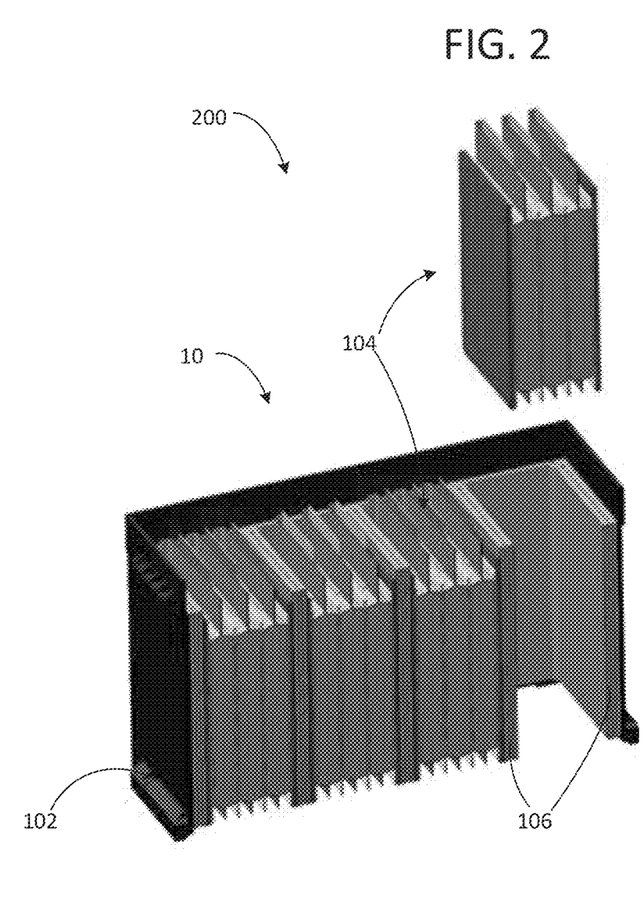
FIG. 2 shows a cross sectional view of the battery assembly of FIG. 1.

Moving on to FIG. 2, it shows a schematic 200 of a cross sectional view of the battery 10 cut along the cutting plane 110 shown above with reference to FIG. 1. Components previously introduced in FIG. 1 are numbered similarly in FIG. 2 and may not be reintroduced. The schematic 200 shows the interior of the battery 10. Three battery cells groups 104 are shown disposed between three protective casings 106. A fourth battery cell group 104 is shown prior to being assembled in battery 10. The structure of each battery cell group 104 will be discussed in greater detail below with reference to FIG. 3.

Figure 3:
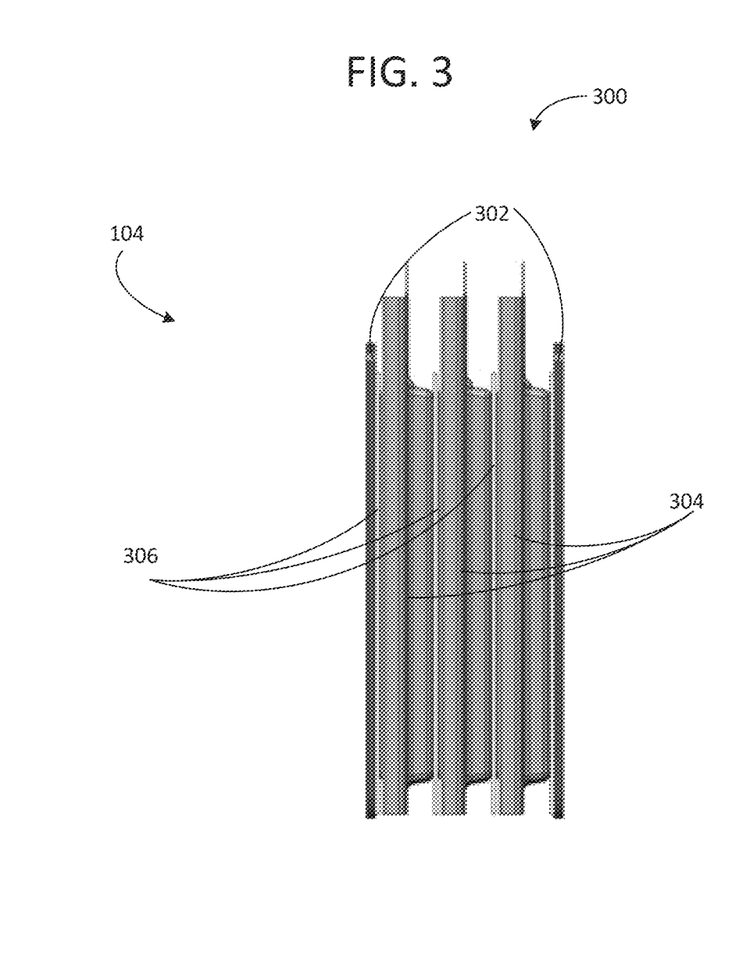
FIG. 3 shows a schematic of a battery cell group.

Turning now to FIG. 3, it shows a schematic 300 of a battery cell group 104 of the battery 10 shown above with reference to FIGS. 1 and 2. Components previously introduced in FIG. 1 are numbered similarly in FIG. 3 and may not be reintroduced. A cell group 104 comprises one or more battery cells 304, one or more compliant pads 306, and one or more end plates 302. Compliant pads 306 may be placed between each of the battery cells 304 of each of the battery cell groups 104, and may be made of an open or closed cell foam or a combination thereof, and may compose characteristics including resilience. The end plates 302 may be a dielectric sized to reduce electrical current transfer between the battery cells 304 and the protective casing 106 shown above with reference to FIG. 1. As shown in the example of FIG. 3, the cell group 104 may comprise three battery cells 304. However, in other examples, the cell group 104 may comprise more or less battery cells 304.

Figure 4:
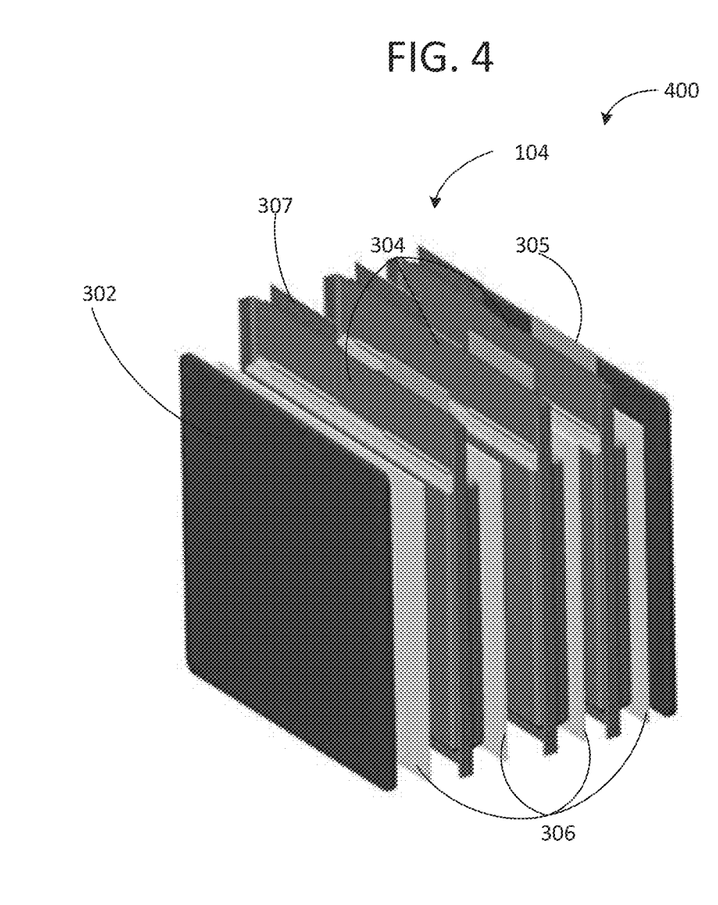
FIG. 4 shows a side perspective view of the battery cell group of FIG. 3.

Turning now to FIG. 4, it shows a side perspective view of battery cell group 104 of the battery 10 shown above with reference to FIGS. 1-3. Components previously introduced in FIGS. 1-3 are numbered similarly in FIG. 4 and may not be reintroduced. The battery cell group 104, may comprise two end plates 302, positioned on opposite ends of the cell group 104. In-between the end plates 302, the battery cells 304 and compliant pads 306 may be arranged in alternating fashion, such that a battery cells 304 is immediately follow by a compliant pad 306. Thus a compliant pad 306 is positioned between each battery cell 304. Further a compliant pad 306 may be positioned between each end plate 302 and the battery cell 304 adjacent to the end plate 302.

Each battery cell 304 may comprise a positive terminal 305 and a negative terminal 307. The battery cells 304 may be pouch type prismatic cells. As such, in the example shown in FIG. 4, the battery cells 304 may be arranged in parallel. Thus, in some examples, all of the battery cells 304 in a cell group 104 may be arranged in parallel to meet the current demands of the battery. However, in other examples, the battery cells 304 may be arranged in series.

Figure 5:
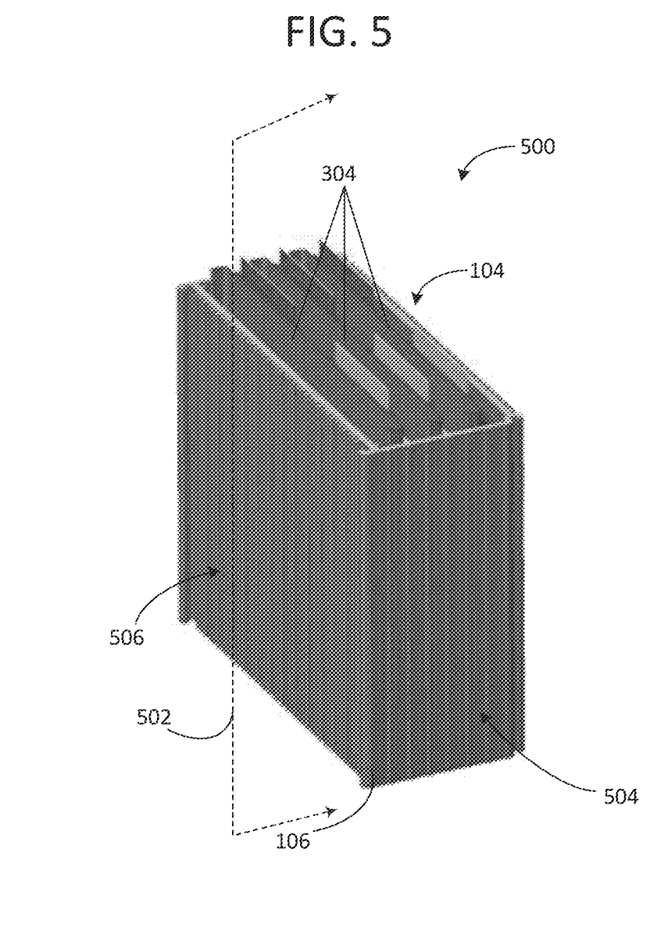
FIG. 5 shows a side perspective view of a portion of the battery of FIG. 1.

In one embodiment, a wall face of protective case 106, which may be an interior wall face of a side wall 506 as shown in FIG. 5, may be in face-sharing contact with a wall face of an end plate 302. A wall face may be considered the major or main face of a wall such as side wall 506, or of a battery cell component with a generally flat shape, such as end plate 302. An edge face may be distinguished from a wall face as being a minor face of a generally flat component, wherein an edge face may be a top or bottom edge of side wall 506, or a thin edge face of end plate 302, which may not be in contact with an adjacent wall face. In one embodiment, wall face of a first end plate 302 may be in face-sharing contact with an interior wall face of a protective casing, such as an interior wall face of side wall 506 (introduced in FIG. 5), or of a partition wall of a protective casing. An opposite wall face of the first end plate may be in face-sharing contact with a wall face of a first compliant pad 306, with an opposite wall face of the first compliant pad 306 in face-sharing contact with a wall face of first cell 304. An opposite wall face of the first cell 304 may be in face-sharing contact with a wall face of a second compliant pad 306, and an opposite wall face of the second compliant pad 306 may be in face-sharing contact with a wall face of a second cell 304. An opposite wall face of the second cell 304 may be in face-sharing contact with a wall face of a third compliant pad 306. An opposite wall face of the third compliant pad 306 may be in face-sharing contact with a wall face of a third cell 304. An opposite wall face of the third cell 30 may be in face-sharing contact with a wall face of a fourth compliant pad 306. An opposite wall face of the fourth compliant pad 306 may be in face-sharing contact with a wall face of a second end plate 302. An opposite wall face of the second end-plate 302 may be in face-sharing contact with a second wall-face of a protective casing or of a partition wall of a protective casing, such as a second side wall 506. A battery cell group may be contained within a chamber or pocket of a protective casing and electrically insulated from any other cell group in any other chamber of a protective casing. Said insulated cell group may alternatively be electrically connected to cell groups in other chambers of a protective casing via a busbar such as busbar 108 and/or busbar 110, but via no other electrical connection.

Turning now to FIG. 5, it shows a schematic 500 of a battery cell group arranged within a protective casing. Specifically, FIG. 5 shows the battery cell group 104 described above with reference to FIGS. 1-4, enclosed with the protective casing 106. Components previously introduced in FIGS. 1-4 are numbered similarly in FIG. 5 and may not be reintroduced. The battery cell group 104 is shown enclosed within the protective casing 106. The protective casing comprises four walls, two side walls 506, and two end walls 504. Cutting plane 502 defines the cross section shown in FIG. 6.

Figure 6:
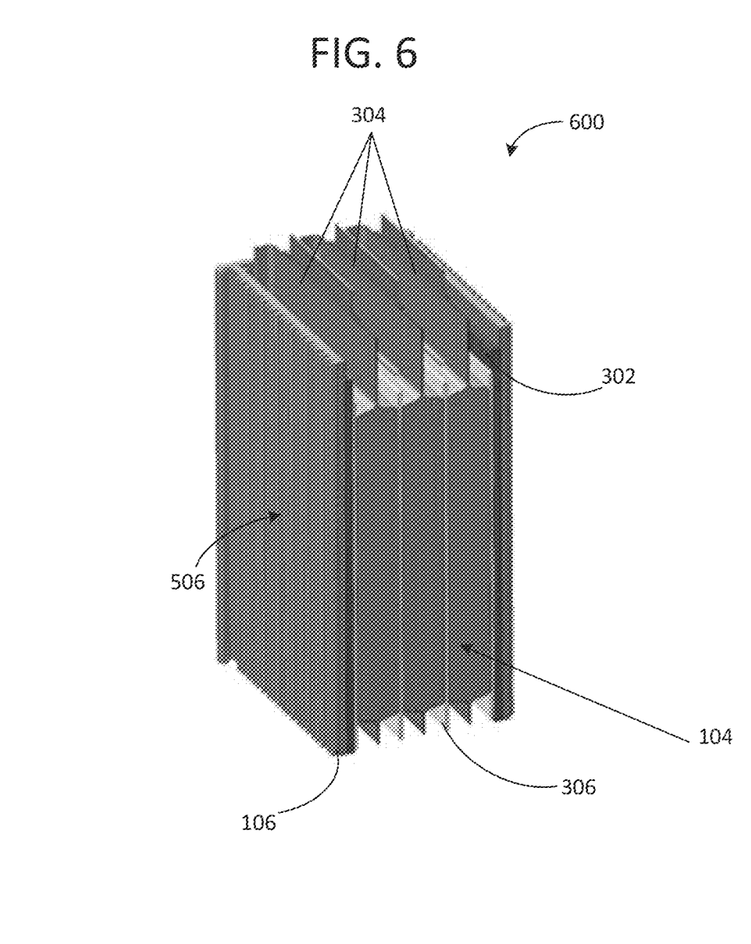
FIG. 6 shows a cross sectional view of the portion of the battery shown in FIG. 5.

Turning now to FIG. 6 it shows a schematic 600, of a cross section of the protective casing 106 shown in FIG. 5 cut along cutting plane 502. Components previously introduced in FIGS. 1-5 are numbered similarly in FIG. 6 and may not be reintroduced. The battery cell group 104, is held between the two side walls 506 of the protective casing 106. The battery cells 304, compliant pads 206 and end plates 302 are pressed together between the two side walls of the protective casing 106. Thus, protective casing 106 may provide a compressive force that reduces relative lateral, horizontal movement of the components of the cell group 104 (e.g. battery cells 304, compliance pads 306, and end plates 302). Additionally, the compliant pads 306 may limit the relative movement between components of the cell group 104 due to their resilient and adhesive properties. Further, the pads 306 may serve as the primary means to facilitate compression of the cell group prior to insertion of the cell group 104 into protective casing 106. The pads 306 may also absorb the expansion and contraction of the cells 304 during nominal and off-nominal operation of the cells. Additionally, the pads 306 may provide mechanical interconnection between the cells 304 for structural constraint, and may dampen externally-generated vibration and shock loads transmitted to the cells 304 during operation.

Further, the protective casings 106 may be made of a metal, such as aluminum. Additionally, the protective casings 106 may be manufactured to withstand a threshold compressive force without deformation. Thus, the protective casings 106 may be designed to absorb a threshold compressive force without causing degradation to the cell groups 104. In some examples the threshold compressive force the protective casing 106 may be able to withstand without deformation is 150 kN. In further examples, the threshold of compressive force may range from approximately 50 kN to 250 kN.

Figure 7:
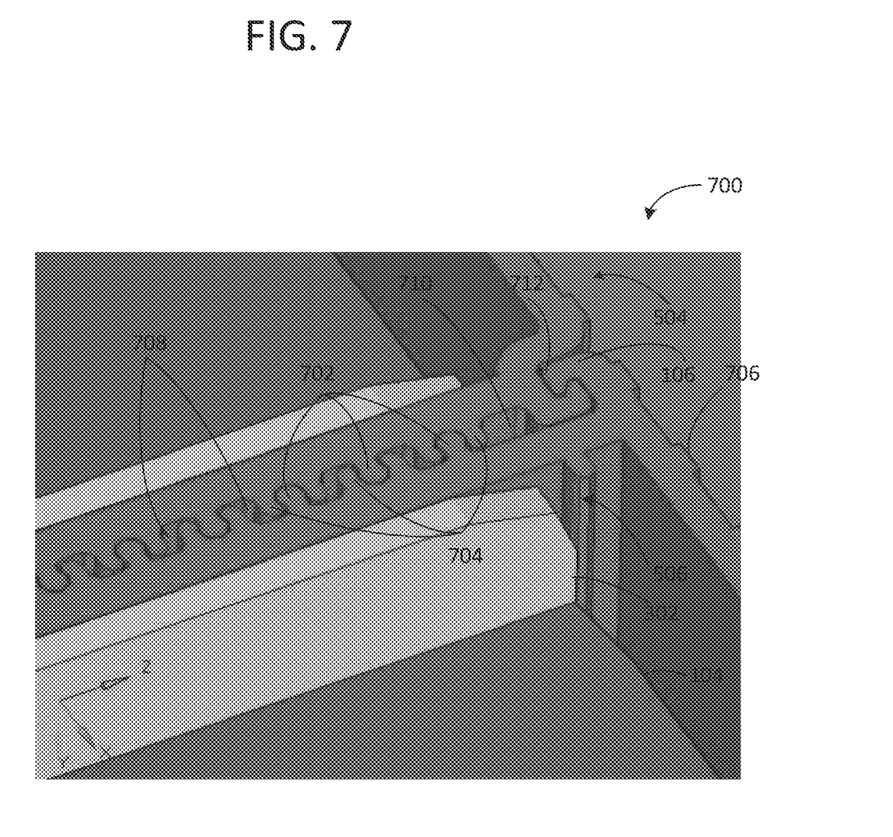
FIG. 7 shows a schematic of a casing enclosing the battery cell group of FIG. 3.

Turning now to FIG. 7, it shows a schematic 700, or a perspective view of the coupling of two protective casings 106. Components previously introduced in FIGS. 1-6 are numbered similarly in FIG. 7 and may not be reintroduced. As shown in FIG. 7, the end plates 302 may be in physical contact on one side with a side wall 506 of the protective casing 106, and on the other side with the cell group 104. Further, as shown in FIG. 7, the protective casings 106 may be coupled to one another in tongue and groove configuration. Thus, each side wall 506 of the protective casing, may comprise a series of tongues or ridges 702 and grooves or slots 704. In alternate embodiments, there may be tongues or ridges 702 and grooves or slots 704 at the edges or corners of the protective casing unit. Each ridge 702 of one protective casings 106, may slide into a mating groove 704 of the adjacent protective casing 106. As such, two protective casings 106 may be coupled to one another through a series of alternating ridges and mating grooves 704. In one embodiment, a first side wall 506 may comprise alternating tongues 702 and grooves 704, and a second side wall 506 to be mated with it may further comprise alternating tongues 702 and grooves 704. In another embodiment, a first side wall 506 may comprise a series of tongues 702, and a second side wall 506 to be mated with it may comprise a series of grooves 704. Side walls 506 may further comprise spaces 708 between tongues 702 and/or grooves 704, wherein no tongue, groove, or joint is present. Tongue and groove joints may be spaced far apart on a side wall 506, with larger spaces 708 inbetween. Tongue and groove joints may also be spaced more closely together, with smaller spaces 708 inbetween, or essentially no space inbetween. An alternate space 710 may exist between a tongue 702, or between a groove 704, and another piece of connecting hardware, such as an alternative interlocking end joint 712. Various spaces between tongue and groove joints or alternative interlocking hardware may be necessary in certain arrangements.

Each end wall 504 of the protective casing 106 may comprise extruded portions 706 which extend from the end wall 504. Thus, the extruded portions 706, may be ridges that are raised from the surface of the end walls 504. The extruded portions 706, may increase the surface area of the end walls 504, and therefore increase adhesion to the case 102 shown in FIG. 1. The extruded portions 706 may be manufactured using any suitable extrusion process. In other embodiments, protective casing 106 may comprise smooth walls.

Figure 8:
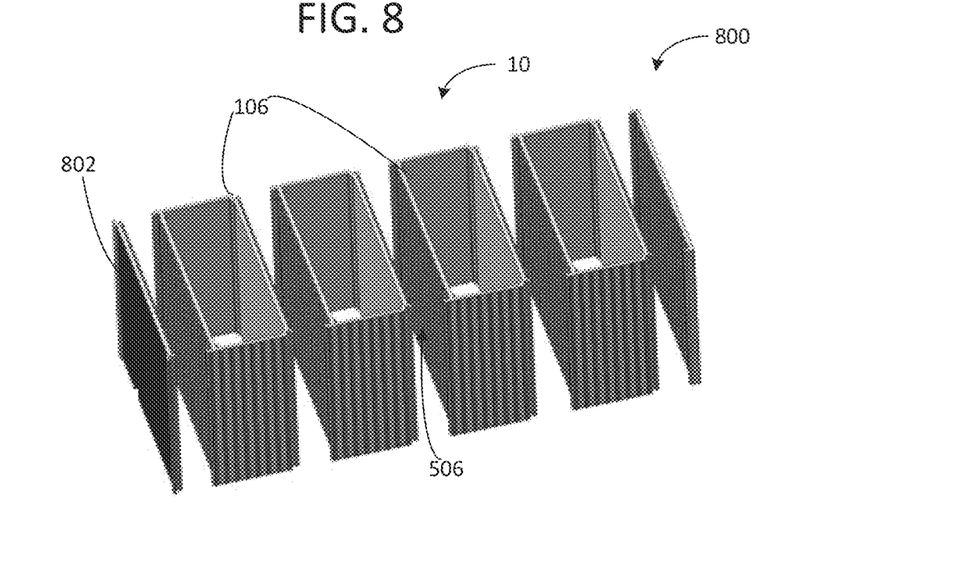
FIG. 8 shows an exploded view of a group of casings used to enclose battery cell groups.

Moving on to FIG. 8, it shows a schematic 800 depicting how multiple protective casings 106 may be assembled within battery 10 shown in FIG. 1. Components previously introduced in FIGS. 1-7 are numbered similarly in FIG. 8 and may not be reintroduced. Specifically, FIG. 8 shows an exploded view of multiple protective casings 106 arranged within battery 10. The casings 106 may be arranged so that their side walls 506 are in face sharing contact with one another. Further, end plates 802 may be coupled to the end of the groups of protective casings. The end plates 802, may comprise the ridge and groove features shown above with reference to FIG. 7, so that the end plates 802 may be physically coupled to the protective casings 106 in the same manner that the protective casings 106 may be coupled to one another.

Figure 9:
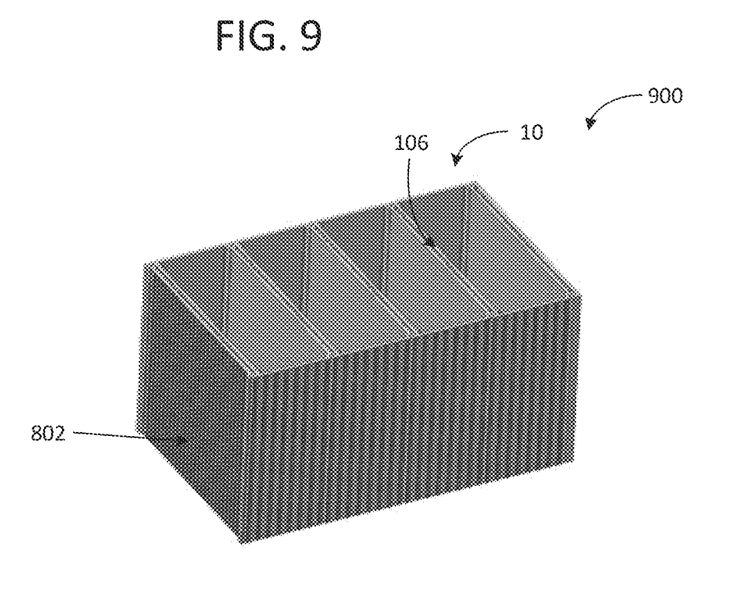
FIG. 9 shows a perspective view of the group of casings of FIG. 8.

Turning now to FIG. 9, it shows a schematic 900 of an assembled view of the four protective casings 106 with the end plates 802 physically coupled thereto. In the example shown in FIG. 9, four protective casings 106 are coupled together in series. However, in other examples, more or less than four protective casings 106 may be coupled together in series with end plates 802 at either end.

Figure 10:
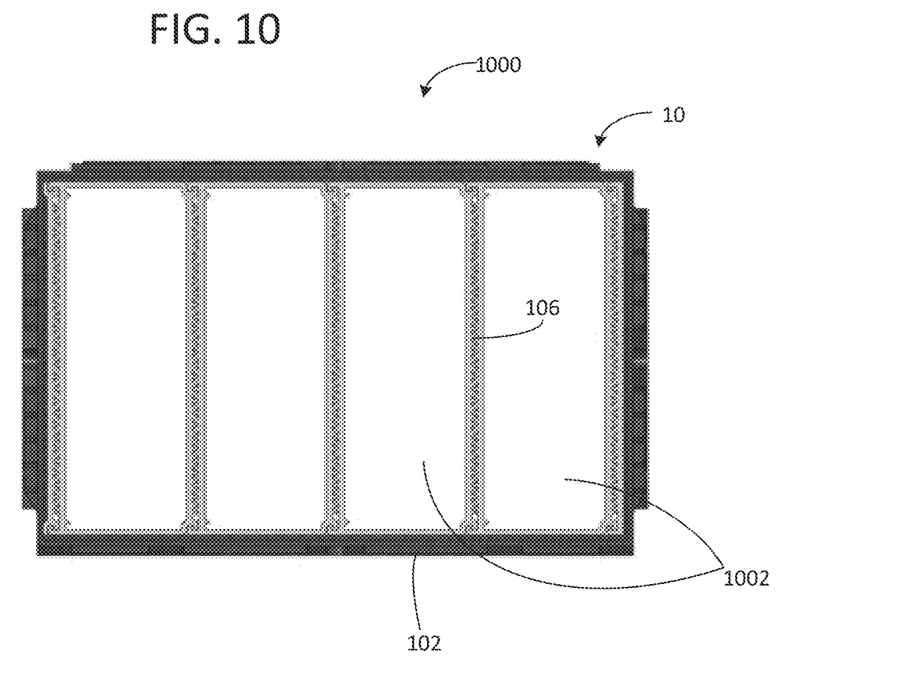
FIG. 10 shows a top view of the battery shown in FIG. 1.

Turning now to FIG. 10, it shows a schematic 1000 of a top view of battery 10. The battery case 102, retains and surrounds the protective casings 106. Pockets 1002 are cavities formed between the walls of the protective casings 106. Each of the battery cells groups 104 shown above with reference to FIG. 1 may be inserted in the pockets 1002. Thus, in some examples, one battery cell group 104 may be inserted into each of the pockets 1002. Said another way, each protective casing 106 may be hollow.

Figure 11:
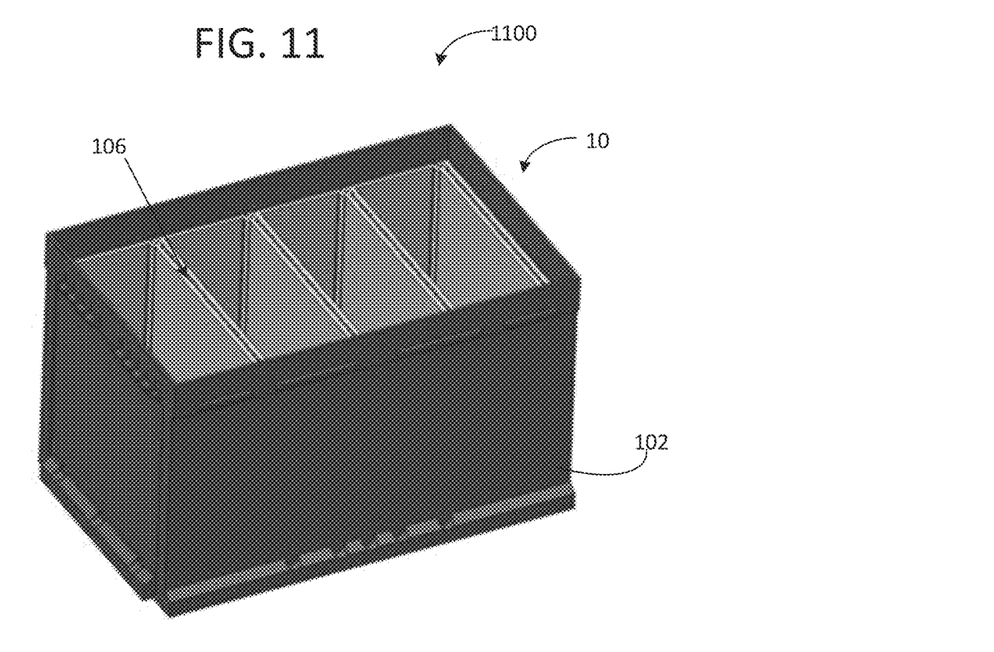
FIG. 11 shows a side perspective view of the battery shown in FIG. 1.

Turning now to FIG. 11, it shows a schematic 1100 of a side perspective view of battery 10, without the battery groups 104 shown in FIG. 1. The protective casings 106 are retained within the battery case 102.

In the previous examples, a structure for a battery comprising a plurality of stacked cell groups contained in a protective casing or series of interlocked protective casings is described. In the following examples, alternative embodiments are given, wherein variations of the structure of the protective casing, its components, or of the interlocking features are exemplified.

Figure 12:
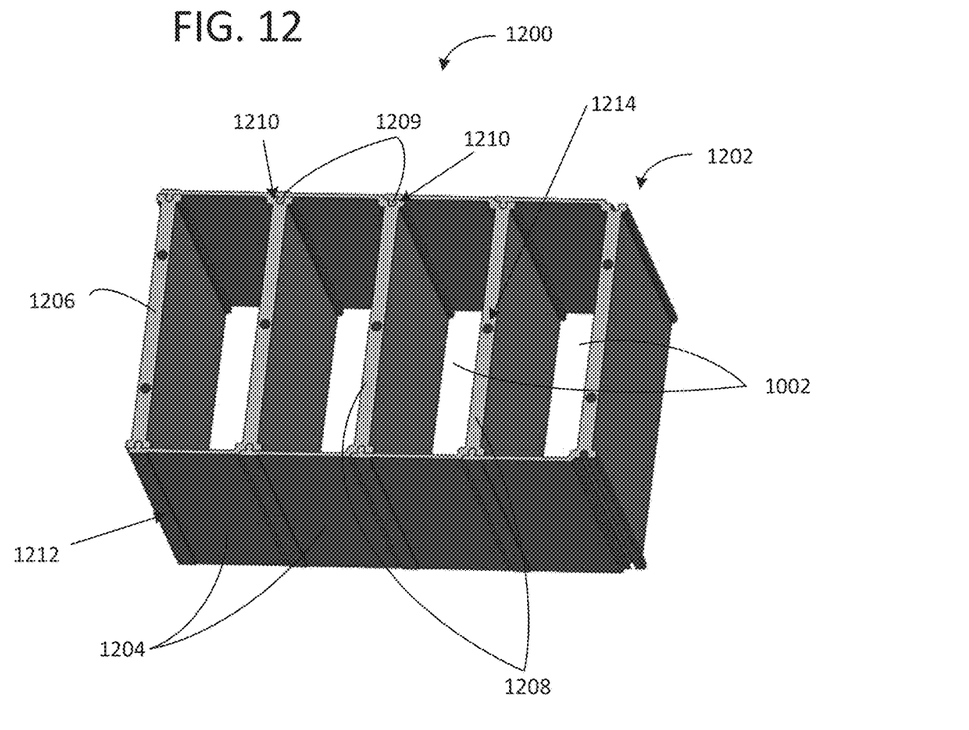
FIG. 12 shows a perspective view of a casing used to enclose battery cell groups.

Moving to FIG. 12, it shows a schematic 1200 of a side perspective view of an alternative example of a protective casing which may be used in battery 10. Components previously introduced in FIGS. 1-11 are numbered similarly in FIG. 12 and may not be reintroduced. A protective casing 1202 is shown, which may comprise a plurality of component segments 1204. Multiple segments 1204 may be interlocked or physically coupled with one another to assemble protective casing 1202. In one embodiment, segments 1204 may be physically coupled or interlocked by ridges 1209 which may be fitted into grooves 1210. In the example shown in FIG. 12, four segments 1204 are coupled together. In other examples, fewer or greater than four segments may be coupled together. Protective casing 1202 may further comprise an end plate 1206, which may have the form of a flat partition wall comprising at least a ridge or ridges 1209 and/or a groove or grooves 1210, and which may interlock with a segment 1204 and enclose a chamber or pocket 1002 on an end of protective casing 1202. Protective casing 1202 may further comprise an additional end plate (not shown), which may be in addition to an end plate 1206, which may be placed adjacent to an end plate 1206 or a partition wall 1208 on an end of a protective casing 1202, which may serve to provide an interface or surface for coupling or adhesion with a battery case such as battery case 102. In one example, the additional end plate may provide a surface with extrusions similar to 1212, which may provide increased surface area for adhesion of battery case 102. In another example, the additional end plate may be smooth, or may serve to provide a flatter exterior of protective casing 1202, and/or to shore up any protrusions on an exterior face of protective casing 1202.

Protective casing 1202 may comprise a plurality of pockets 1002, which may be functionally similar to the pockets 1002 shown in FIG. 10. A battery cell group such as cell group 104 (not shown) may be enclosed within each pocket 1002. The battery may have a battery case such as battery case 102 (not shown) surrounding protective casing 1202. The protective casing 1202, which may optionally include an end plate 1206, may comprise four outer walls arranged in a rectangular prism, which may enclose the cell groups therein. The protective casing 1202 may further comprise partition walls 1208, which may divide the interior area of protective casing 1202 into a number of pockets 1002. In some examples, the partition walls may each be a part of a component segment 1204. In one embodiment as shown in FIG. 12, there may be three partition walls 1208 and four pockets 1002. In other examples, there may be fewer or greater than three partition walls 1208, and there may be fewer or greater than four pockets 1002. The exterior surface of protective casing 1202 may comprise extruded portions 1212 which may extend from the exterior wall of protective casing 1202. Extruded portions 1212 may be ridges that are raised from the surface of protective casing 1202, and may increase the surface area of the protective casing exterior, therefore increasing adhesion to a battery case 102 (not shown). Extruded portions 1212 may also provide strength, support, and rigidity to protective case 1202, and/or to the ridges 1209, the grooves 1210, or the joints therebetween. Partition walls 1208 may have at least one bore hole or connector hole 1214, which may be a hole on a top face of a partition wall which may extend some length into the interior mass of the partition wall. The connector hole 1214 may extend partially or completely through the mass of the partition wall 1208. In another example, a connector hole may be on a top or bottom face of the exterior walls of the protective casing. The connector hole 1214 may receive or be mated with a protrusion of a battery case which may fit inside. The connector hole 1214 may guide or secure the position of battery case or a portion of a battery case, which may be a portion of battery case 102. Connector hole 1214 may also be a screw hole, which may comprise threads or internal securing geometry, or may accept some other form of fastener.

Figure 13:
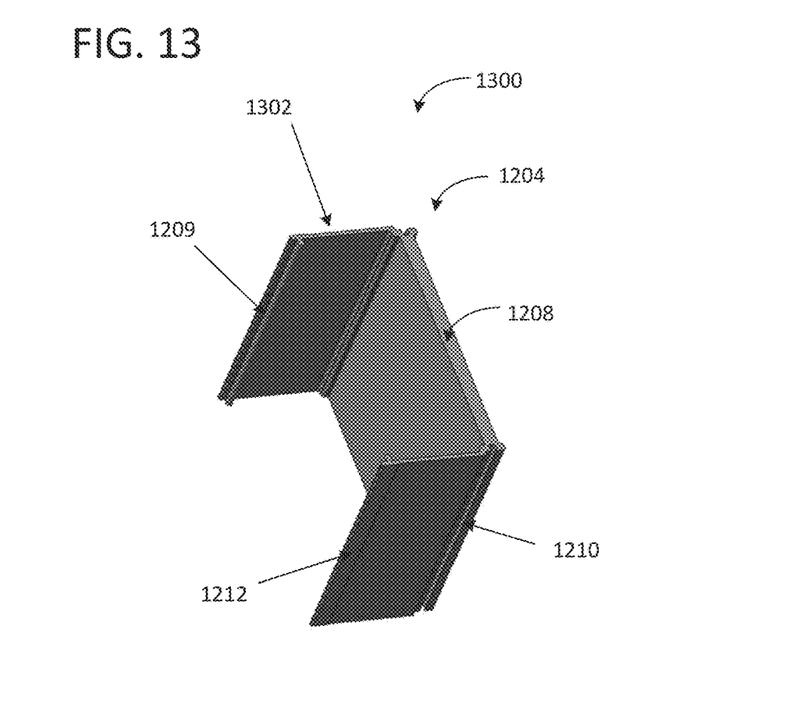
FIG. 13 shows a perspective view of a component of the casing shown in FIG. 12.

Turning to FIG. 13, it shows a schematic 1300 of a side perspective view of a protective casing component segment 1204. Components previously introduced in FIGS. 1-12 are numbered similarly in FIG. 13 and may not be reintroduced. Multiple segments 1204 may be interlocked or physically coupled with one another to construct protective casing 1202, as shown in FIG. 12. In the embodiment exemplified in FIG. 13, segment 1204 may have the form of three sides of a rectangular prism, forming a three-walled, "C"-shaped bracket. Segment 1204 may be made of metal, which in some examples may be aluminum or steel. Segment 1204 may further be made of a plastic such as nylon, a composite plastic, or a structural composite. The center wall of segment 1204 may form a partition 1208 when incorporated as a component of protective casing 1202. Component segment 1204 may further comprise end walls 1302 at each end of partition 1208 at a perpendicular angle. Also shown is ridge 1209, which may interlock with groove 1210 when multiple segments 1204 are joined. Further shown is extruded portion 1212.

Figure 14:
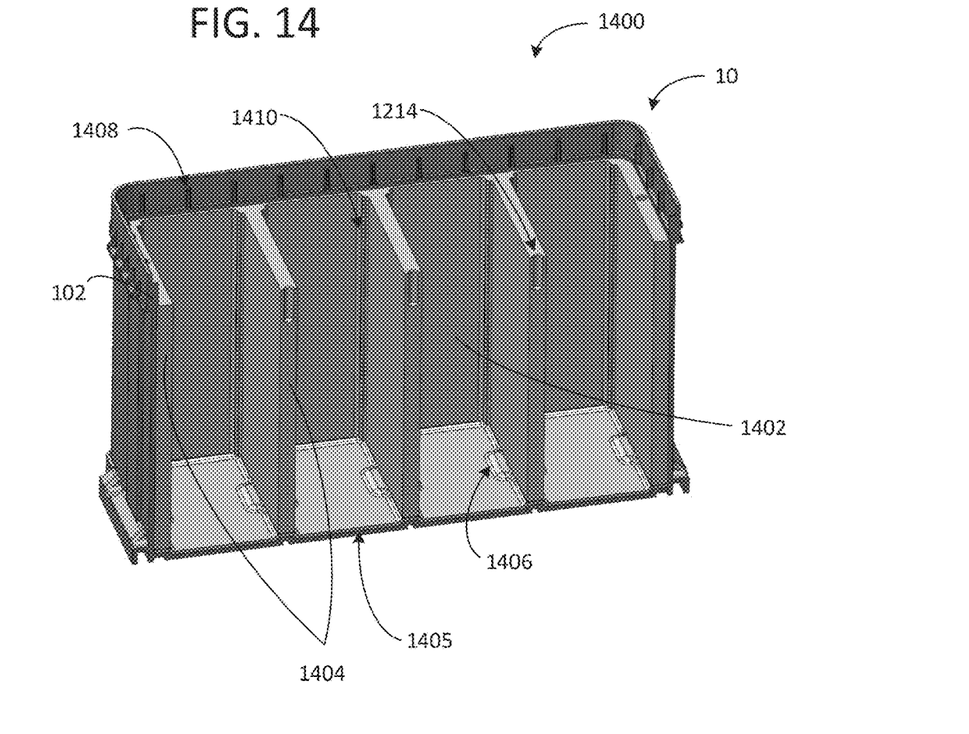
FIG. 14 shows a cross-sectional view of a casing used to enclose battery cell groups.

Turning now to FIG. 14, it shows a schematic 1400 of a side perspective view of a further embodiment of battery 10. Components previously introduced in FIGS. 1-13 are numbered similarly in FIG. 14 and may not be reintroduced. In a set of embodiments, the battery 10 may comprise a protective casing 1402 of a monolithic construction, where the interior partitions 1404 and the exterior walls of the protective casing 1402 are made of a single piece of extruded material. In other embodiments, the protective casing 1402 may be made of a single piece of material that is not extruded, where in some examples the material may cast. Protective casing 1402 may, in further embodiments, be constructed of sections or pieces that are welded, fused, or adhered together. Protective casing 1402 may have a raised ridge 1410, which may provide support, strength, and increased rigidity to the exterior wall of protective casing 1402, the partition wall 1404, or a joint therebetween. A bore hole or connector hole 1214 may be comprised on a top or bottom face of the partition walls 1404 or exterior walls. The battery 10 may further comprise a battery case 102, which may be similar to battery cases 102 described in other embodiments. The battery case 102 may include ridges 1408 raised from the surface of the battery case 102, to provide support, strength, and increased rigidity to the battery case 102. In those embodiments of battery 10 incorporating protective casing 1402, battery cell groups such as cell groups 104 (not shown) may be encased in the hollow spaces of protective casing 1402 in a similar manner as described in other embodiments herein. Battery 10 may further comprise a case floor 1405, supported on which may be a notch 1406 which may guide and secure the placement of the protective casing 1402. In one example, the notch 1406 may secure the position of a side wall 1404.

Figure 14A:
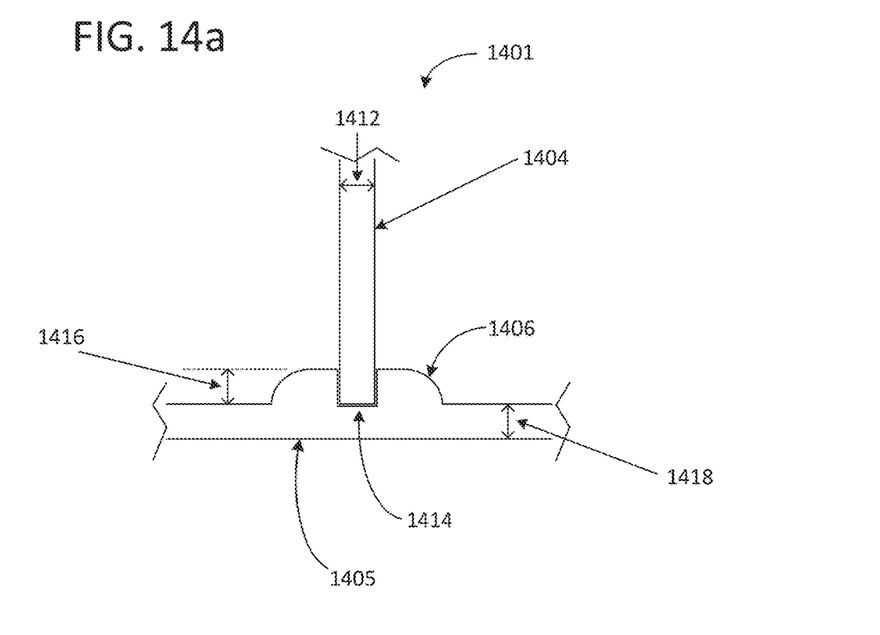
FIG. 14a shows a cross-sectional detail view of the battery casing of FIG. 14.

Turning to FIG. 14a, it shows a schematic 1401 of a cross sectional view of a detail of the battery casing of FIG. 14.

Components previously introduced in FIGS. 1-14 are numbered similarly in FIG. 14a and may not be reintroduced. In one embodiment, a battery casing floor 1405 may support a notch 1406 which may guide and secure the position of a partition wall 1404 of a battery casing 1402. In other embodiments, notch 1406 may support a protective casing such as protective casing 106 or protective casing 1202. Partition wall 1404 may rest inside a groove such as groove 1414. In other examples, an exterior wall or other component of a protective casing may rest in groove 1414. Groove 1414 may have a depth 1416, which may also be a raised height of notch 1406. Partition wall 1404 may have a thickness 1412 which may be approximately or slightly less than a width of groove 1414, such that partition wall 1404 may fit snugly and securely inside groove 1414. Case floor 1405 may further have a thickness 1418.

Figure 15:
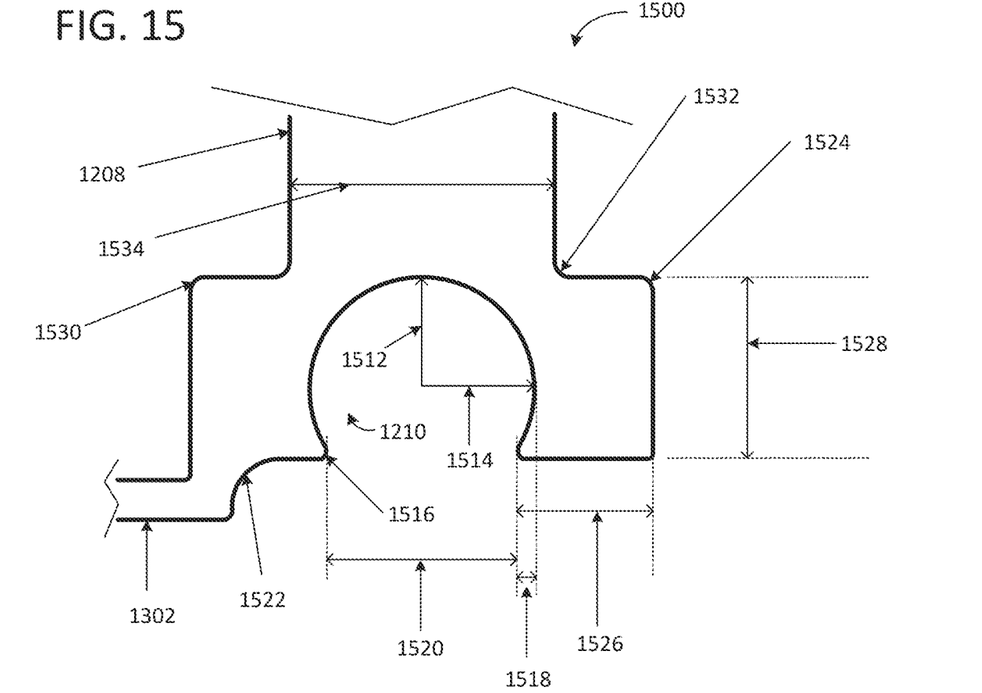
FIG. 15 shows a cross-sectional view of a groove which may be used for interlocking battery casings.

Turning to FIG. 15, it shows a schematic 1500 of a cross-sectional view of a groove 1210. Components previously introduced in FIGS. 1-14 are numbered similarly in FIG. 15 and may not be reintroduced. Groove 1210 is a concave area in a protective casing such as protective casing 106, or a component of a protective casing such as component segment 1204. Groove 1210 may also represent an embodiment of groove 704. Groove 1210 may be used to receive a tongue or ridge such as ridge 1209 or ridge 702, which may slide into groove 1210 and interlock with it. A concave area of groove 1210 may have a cross sectional area which may have a circular or elliptical shape, or in other examples may have a polygonal shape. Groove 1210 may comprise a radius 1512 and may optionally have a second radius 1514. The length of radius 1512 and 1514 may be uniform or may vary from one another, in some examples giving the cross-section of the concavity of groove 1210 a circular sectional shape, and in other examples an elliptical or irregular curve or arc shape. A cross-section of the concave area of groove 1210 may have the shape of a circular or elliptical section which may partially surround a ridge of similar cross-sectional shape seated within it, such that the ridge, which may be ridge 1209 or ridge 702, and the hardware attached to the ridge may not pull free of the groove 1210. An exterior corner 1516 may have a curved finish, which may comprise a radius. The concave area of groove 1210 may have an eccentricity 1518 which extends into the mass of the protective casing at a perpendicular angle to the depth of the concavity. The groove 1210 may comprise an exterior opening of width 1520. Adjacent to the opening may be a notch 1522, which may optionally have a radiused cross-sectional profile, and which further may allow space and supporting hardware of an interlocked ridge such as ridge 1209 to sit flush with an exterior edge of the exterior wall of the protective case 1202, which may be end wall 1302 of component section 1204. An exterior edge of the groove 1210 may have a railing 1524 with a width 1526 and a depth 1528, which may serve to support and give rigidity to the outer portion of groove 1210. One or more corners of railing 1524 may have a rounded or beveled edge. The railing 1524 may be adjacent to or have faces that intersect at an intersection point 1532 with the partition wall 1208. Intersection point 1532 may have a rounded or beveled edge. Partition wall 1208 may have a width 1534, which in one example may exceed the width of the concave area of groove 1210. The width of the concave area of groove 1210 may be twice the radius 1514. There may also be an interior railing 1530, which further may add strength and rigidity to the groove 1210. All corners and intersections of planes, which may be described as having curved or radiused edges herein, may alternatively have cross sectional profiles comprising sharp corners of some angle, or a beveled or chamfered edge profile.

Figure 16:
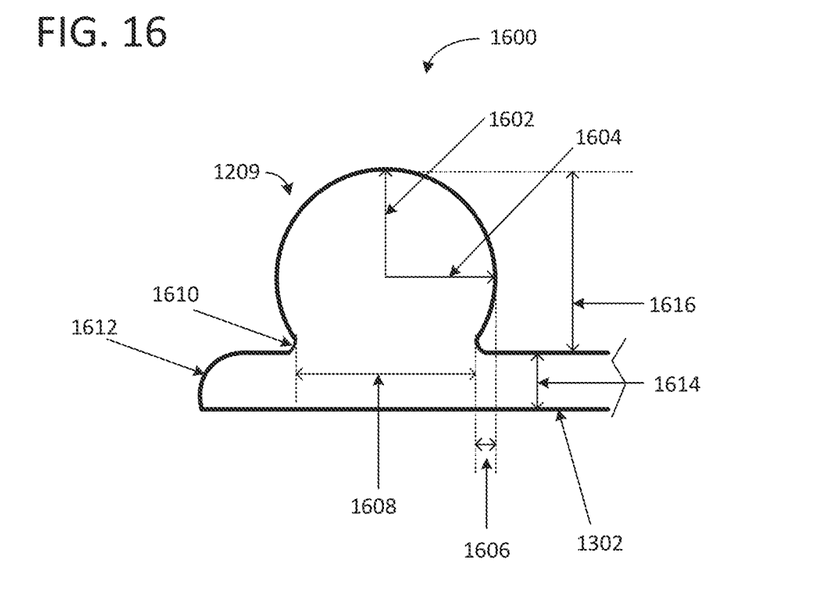
FIG. 16 shows a cross-sectional view of a ridge which may be used for interlocking battery casings.

Turning now to FIG. 16, it shows a schematic 1600 of a cross-sectional view of a ridge 1209. Components previously introduced in FIGS. 1-15 are numbered similarly in FIG. 16 and may not be reintroduced. Ridge 1209 is a protruded tongue on a protective casing 106 or a component segment 1204. Ridge 1209 may also be an embodiment of ridge 702. Ridge 1209 may slide into and/or interlock with groove 1210. The main protrusion of ridge 1209 may have a cross-sectional area with a circular or elliptical shape, or may have an irregularly curved or polygonal shape. The main protrusion of ridge 1209 may have a height 1616 which rises from a surface of end wall 1302. The cross-section of the main protrusion of ridge 1209 may have a radius 1602, and may optionally have a second radius 1604. The cross sectional shape of ridge 1209 may correspond to the cross-sectional shape of groove 1210 such that ridge 1209 may slide into groove 1210 and form a snug joint. The main protrusion of ridge 1209 may have an eccentricity 1606. A cross-section of the main protrusion of ridge 1209 may also have a neck 1610, which may be an area at which ridge 1209 is coupled to an end wall 1302 of component section 1204. This "neck" may have a width 1608, which may be made wider to give more support and rigidity to ridge 1209, or may me made narrower such that the ridge 1209 protrudes further, or such that a groove 1210 may be able to more completely surround ridge 1209 so as to form a more secure joint. Neck 1610 may have a rounded or beveled edge. Adjacent to ridge 1610 may be a protrusion 1612, which may have a rounded or sharp-cornered edge. Protrusion 1612 may fit into notch 1522 such that an exterior wall of a protective casing 1202 may be flush across end walls 1302 of adjacent component casings 1204. End wall 1302 may have a thickness 1614. All corners and intersections of planes, which may be described as having curved or radiused edges herein, may alternatively have cross sectional profiles comprising sharp corners of some angle, or a beveled or chamfered edge profile.

In the exemplary embodiments described herein, the protective casing of battery 10 may be considered a single protective casing comprising a series of protective casing component segments. These component segments in some embodiments may have four walls, and each individual component segment may be itself a protective casing, and/or may be a component of a larger protective casing with a plurality of chambers, cavities, or pockets. These pockets may be of uniform size and shape or may have varied sizes and/or shapes. In other embodiments, the component segments of a protective casing may be three-sided structures which may not individually provide an enclosure for a battery cell group, but may provide a protective casing comprising cavities, chambers, or pockets for the enclosure of cell groups when component segments are coupled together. In further embodiments, the protective casing of battery 10 may comprise a single, monolithic extrusion, comprising cavities, chambers, or pockets for the enclosure of cell groups, wherein the monolith is a solid structure, not comprised of interlocked component segments. A monolithic protective casing may alternately be assembled from pieces that are welded, fused, or adhered to construct the monolith. In this way, a protective casing comprising one or more cavities or chambers for the enclosure of battery cell groups may flexibly comprise extruded parts in embodiments where extrusion techniques allow for its manufacture, and said protective casing may be constructed of smaller component segments in embodiments where the protective casing is too large to be extruded as a single monolith, for example.

In the examples described herein, a protective casing assembly or monolith may comprise four walls with one or more interior chambers, cavities, or pockets separated by at least one partition wall spanning the interior of the protective casing. The partition wall may be a side wall of a protective casing interlocked with an adjacent protective casing, or in other examples may be a part of a three-sided component segment used to assemble a protective casing. In further examples, the partition walls may be a part of a monolithic protective casing. In embodiments of a protective casing featuring interior partition walls, a protective casing may have a structurally significant form which provides mechanical strength, wherein the protective casing may withstand a significant amount of compressive force or impact without deforming.

In another representation, a battery may comprise a plurality of prismatic shaped battery cells, arranged and stacked to form a series of battery cell groups, the groups electrically coupled to form a single battery positive and negative supply, where the groups are distinct groups that do not share any battery cells. All of the battery cells may be positioned entirely within a housing. The battery may further comprise an extruded protective casing separately enclosing each battery cell group, the casing having exterior side walls enclosed by walls of the housing. The walls of the housing may be generally planar and may be in face sharing contact the walls of the casing, which may also be similarly generally planar. The protect casing may comprise a plurality of interior pockets, each of which encloses distinct battery cell groups, with the pockets formed by interior partition walls of the casing. The interior walls may also be generally planar and in one example are do not have their major surface in face sharing contact with interior surfaces of walls of the housing. In some examples, the casing may be formed monolithically via a common extrusion. In other examples, the casing may be formed by combining a plurality of separate monolithic extrusions via a slide-joint, with at least two of the separate monolithic extrusions combined together being identical in their extruded shape.

In another representation, a battery of a vehicle system may be provided, where the vehicle system includes an internal combustion engine, or an electric powertrain having an electric motor without an internal combustion engine. The battery may include a plurality of prismatic shaped battery cells, arranged and stacked to form a plurality of battery cell groups; and a protective casing, comprising a plurality of interior pockets, each of which encloses distinct battery cell groups, wherein the plurality of interior pockets are separated by at least one partition wall, wherein an exterior of the protective casing is not exposed to the environment surrounding the exterior of the battery. The protective casing may be formed from slide-fit connections, without any other connections between the components forming the protective casing. Alternatively, the casing may be formed as a monolith, without any connections connecting portions of the protective casing together. The protective casing may be coupled to the housing via connectors engaging holes in ends of the walls of the casing.

FIGS. 1-16 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. It is understood that various changes can be made without departing from the spirit and scope of the disclosure. As previously described, the features of various embodiments can be combined to form further embodiments of the invention that may not be explicitly described or illustrated. The subject matter of the present disclosure includes all novel and non-obvious combinations and sub-combinations of the various systems and configurations, and other features, functions, and/or properties disclosed herein.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A battery comprising:
   a plurality of prismatic shaped battery cells, arranged and stacked to form a series of battery cell groups; and
   a protective casing within a battery case, comprising a plurality of modular elements interconnecting through a ridge and mating groove configuration forming a plurality of interior pockets, each of which encloses a distinct battery cell group in the series of battery cell groups;
   wherein the plurality of interior pockets is separated by a partition wall extending laterally across the battery and interposed between sequential battery cell groups in the series of battery cell groups;
   wherein the partition wall includes:
      a first planar side in face sharing contact with and parallel to a first dielectric end plate; and
      a second planar side in face sharing contact with and parallel to a second dielectric end plate;
   wherein the ridge and mating groove configuration extends along at least a portion of the partition wall and includes a plurality of ridges mating with a plurality of grooves;
   wherein the pluralities of ridges and grooves are positioned longitudinally between the first and second dielectric end plates and the first and second planar sides of the partition wall;
   wherein the plurality of ridges continuously interlock with the plurality of grooves; and
   wherein the plurality of ridges each include a curved wall and the plurality of grooves each include a curved wall.

2. The battery of claim 1, wherein the plurality of ridges and the plurality of grooves extend and interconnect along an entire length of an interconnected shared face from a first interlocking end joint to a second interlocking end joint.

3. The battery of claim 1, wherein the series of battery cell groups comprises a plurality of compliant pads.

4. The battery of claim 3, wherein the first and second dielectric end plates restrict current flow between adjacent battery cell groups in the series of battery cell groups.

5. The battery of claim 4, wherein each of the first and second dielectric end plates is positioned between a side wall of the protective casing and a compliant pad in the plurality of compliant pads.

6. The battery of claim 5, wherein each of the plurality of compliant pads is positioned in-between two battery cells in the plurality of prismatic shaped battery cells.

7. The battery of claim 3, wherein the protective casing provides a compressive force on the series of battery cell groups to restrict relative movement of the plurality of prismatic shaped battery cells, compliant pads, and first and second dielectric end plates in the series of battery cell groups and wherein the plurality of modular elements interconnecting through the ridge and mating groove configuration restricts relative movement of the plurality of modular elements.

8. The battery of claim 1, wherein the protective casing comprises a material selected from aluminum, steel, a composite plastic, or a structural composite.

9. The battery of claim 1, wherein an interior surface of the battery case includes at least one ridge or groove for mating with a corresponding groove or ridge of an end wall of the protective casing.

10. The battery of claim 9, wherein the end wall of the protective casing comprises a plurality of extruded ridges running an entire length of the end wall and wherein the end wall is physically coupled to the battery case through the plurality of extruded ridges.

11. The battery of claim 10, wherein the battery case, which encloses the protective casing, is comprised of plastic.

12. The battery of claim 1, further comprising four interior pockets, wherein each of the four interior pockets comprises one battery cell group in the series of battery cell groups.

13. The battery of claim 1, wherein the plurality of interior pockets have the shape of rectangular prisms.

14. The battery of claim 1, further comprising two end covers, positioned between and coupled to, a plurality of interior walls of the battery case.

15. The battery of claim 1, wherein the plurality of modular elements of the protective casing consists essentially of a plurality of monolithic pieces of extruded material.

16. The battery of claim 1, wherein the battery is a Lithium-Ion battery.

17. The battery of claim 1, wherein the plurality of prismatic shaped battery cells in the series of battery cell groups is arranged and electrically coupled to one another in series.

18. The battery of claim 1, wherein the plurality of prismatic shaped battery cells in the series of battery cell groups is arranged and electrically coupled to one another in parallel.

19. The battery of claim 6, wherein the plurality of compliant pads is constructed out of closed or open cell foam.

* * * * *